(12) United States Patent
Liang (10) Patent No.: US 8,050,027 B2
(45) Date of Patent: Nov. 1, 2011

(54) DATA CARTRIDGE DEVICE FOR COMPUTER EQUIPMENT

(75) Inventor: Chien-Kuo Liang, Chung-Ho (TW)

(73) Assignee: Ablecom Technology Incorporated, New Taipei (TW)

( * ) Notice: Subject to any disclaimer, the term of this patent is extended or adjusted under 35 U.S.C. 154(b) by 1152 days.

(21) Appl. No.: 11/822,421

(22) Filed: Jul. 5, 2007

(65) Prior Publication Data

US 2010/0187957 A1    Jul. 29, 2010

(51) Int. Cl.
*G06F 1/16* (2006.01)

(52) U.S. Cl. .................................. 361/679.37

(58) Field of Classification Search ............. 361/679.01, 361/679.31, 679.32, 679.33; 312/322.2
See application file for complete search history.

(56) References Cited

U.S. PATENT DOCUMENTS

| 5,277,615 A | * | 1/1994 | Hastings et al. | 361/679.32 |
| 5,306,079 A | * | 4/1994 | Liu | 312/223.2 |
| 6,067,225 A | * | 5/2000 | Reznikov et al. | 361/679.31 |
| 2005/0094369 A1 | * | 5/2005 | Chen et al. | 361/685 |
| 2007/0127206 A1 | * | 6/2007 | Wade et al. | 361/685 |
| 2008/0030946 A1 | * | 2/2008 | Lee | 361/685 |

* cited by examiner

*Primary Examiner* — Lisa Lea Edmonds
(74) *Attorney, Agent, or Firm* — Jackson IPG PLLC; Demian K. Jackson (57) ABSTRACT

A data cartridge device for computer equipment includes a data cartridge which is assembled in an interior of an outer cover, so to be provided with a shock-proof effect. Widths of two side walls of the data cartridge are effectively decreased to reduce entire size of the data cartridge, and an upper and a lower layer of the outer covers are stacked with each other to effectively utilize a storage space. By the modularized design of the outer covers and the data cartridges, the present invention can be flexibly applied to outer housings with various heights (such as an industrial computer cabinet, or a server cabinet).

10 Claims, 10 Drawing Sheets

DATA CARTRIDGE DEVICE FOR COMPUTER EQUIPMENT

BACKGROUND OF THE INVENTION a) Field of the Invention

The present invention relates to a data cartridge device for computer equipment, and more particularly to a data cartridge, which is assembled in an outer cover to provide a shock-proof effect, widths at two side walls of which are effectively decreased to reduce entire size thereof, and an upper layer of which is stacked with a lower layer of which to effectively utilize a storage space.

b) Description of the Prior Art

A conventional data cartridge for computer equipment is usually applied to a server or a host, wherein as more and more functions are available for industrial computers, more and more data cartridges (such as hard drive fixing cartridges) for being inserted with the server or the host are required. A typical example is disclosed in the Taiwanese Utility Model Patent Application No. 090216225, which is an extraction cartridge, and two side walls of which are provided with slide rails. Therefore, as widths at the two side walls are large, the slide rails will occupy entire size of the extraction cartridge. Especially as the extraction cartridge is emplaced in a slot of an outer housing, the still extraction cartridge will be under a long term condition of vibration due to vibration of parts (such as fans) in the outer housing, which results in damage or reduction of lifetime of usage to parts (such as hard disks) that are installed in the extraction cartridge.

Furthermore, when an upper and a lower layer of the extraction cartridges are assembled in the outer housing, a partition plate should be installed in an interior of the outer housing to serve as a rail for inserting the upper and lower cartridges, as disclosed in the Taiwanese Utility Model Patent Application No. 89208050.

SUMMARY OF THE INVENTION

The primary object of the present invention is to provide a data cartridge device for computer equipment, wherein the data cartridge is inserted into a slot of an outer housing, and thereby effectively achieving a shock-proof effect.

Another object of the present invention is to provide a data cartridge device for computer equipment, wherein widths at two side walls of the data cartridge are effectively decreased, and thereby reducing entire size of the data cartridge.

Still another object of the present invention is to provide a data cartridge device for computer equipment, wherein the data cartridge is sliding smoothly, quickly and conveniently, upon being pulled out of or inserted into a slot of an outer housing.

Still yet another object of the present invention is to provide a data cartridge device for computer equipment, wherein upon stacking multiple data cartridges vertically, a top plate of an outer cover is used as a bottom seat of an upper data cartridge, such that a rail or a support beam will not be installed in an interior of an outer housing to reduce manufacturing cost and to sufficiently utilize an internal space of the outer housing.

A further object of the present invention is to provide a data cartridge device for computer equipment, wherein by a modularized design of an outer cover and the data cartridge, the data cartridge device can be flexibly applied to all kinds of outer housings with different heights (such as an industrial computer cabinet or a server cabinet).

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
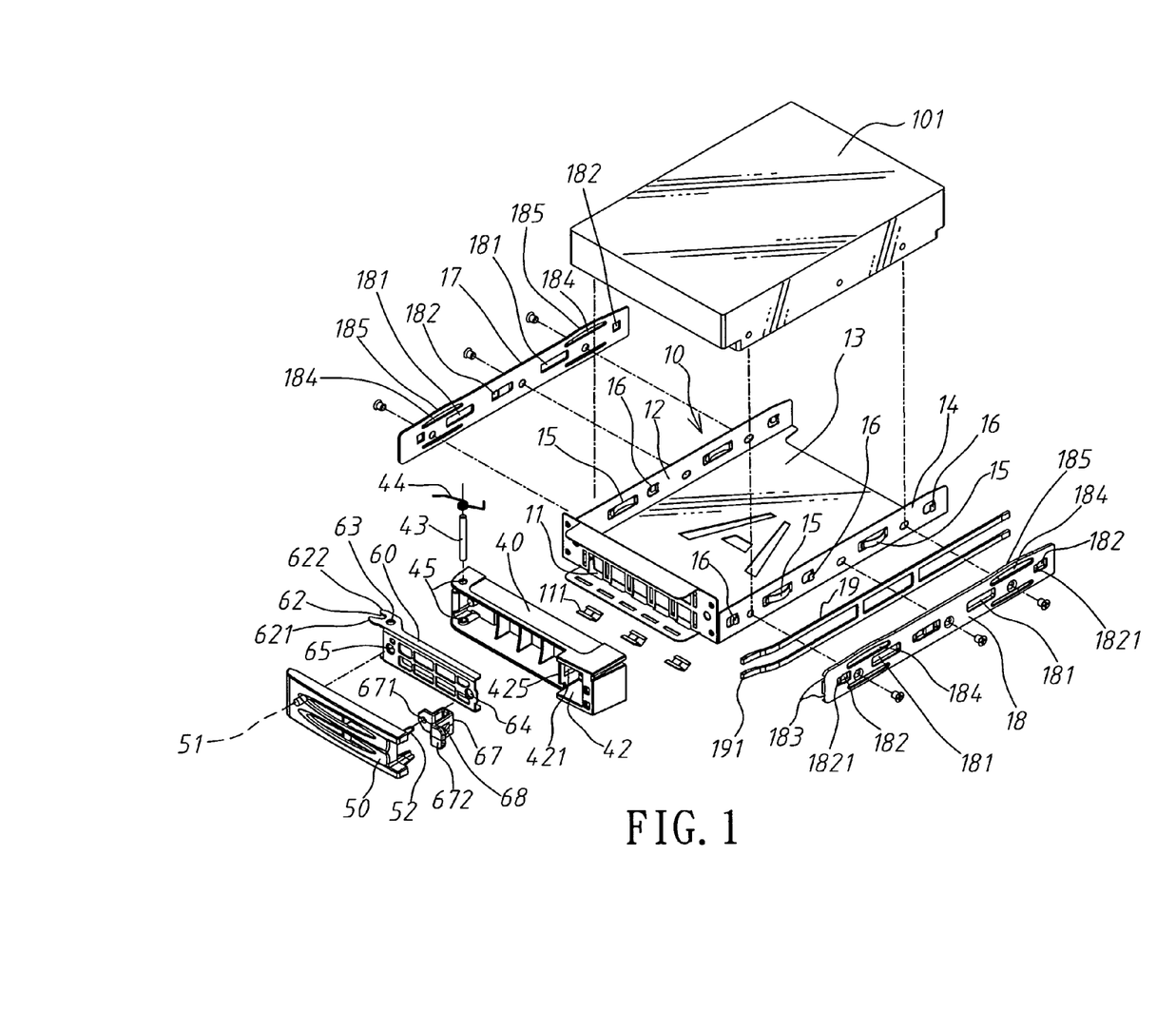
FIG. 1 shows an exploded view of parts of a data cartridge, according to the present invention.
Figure 4:
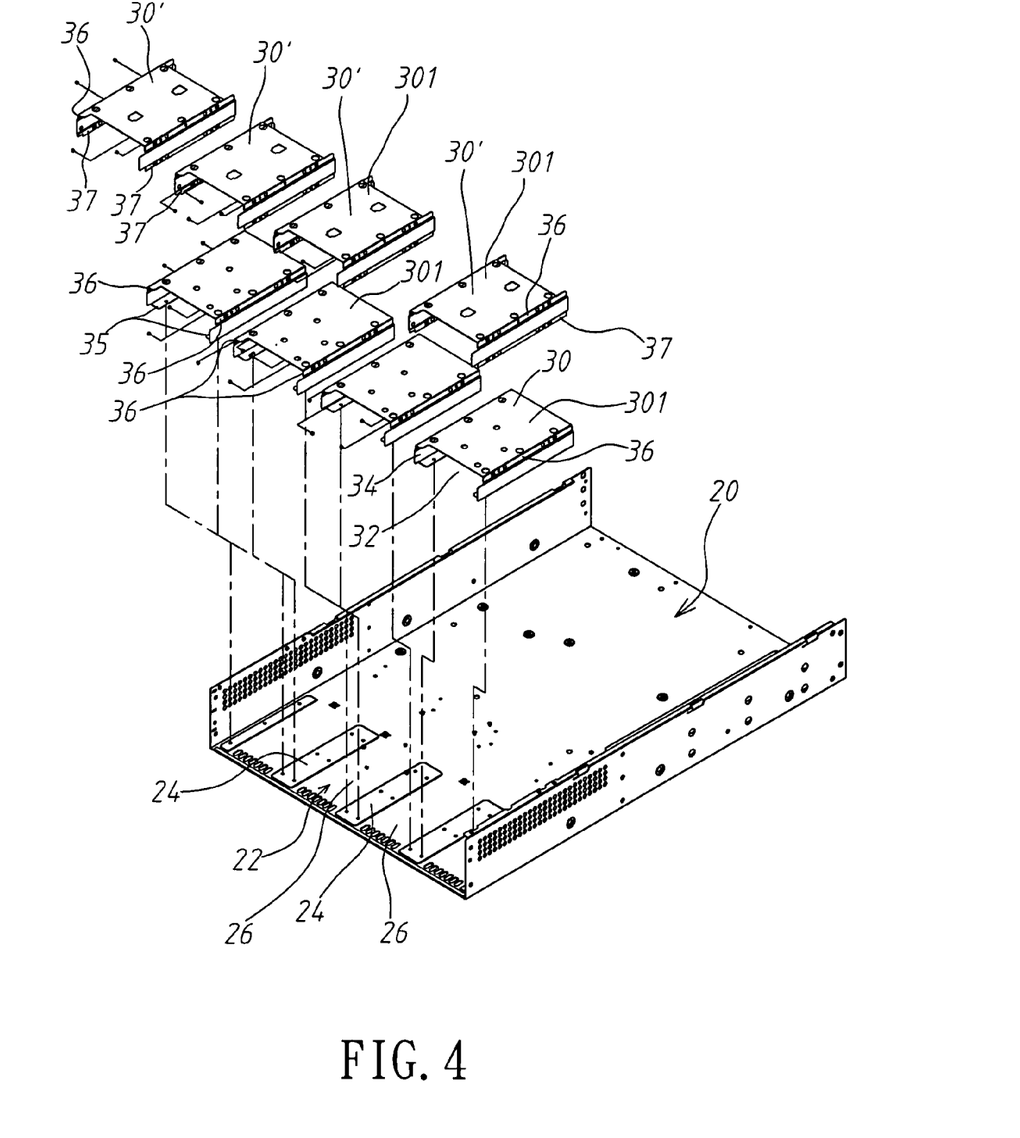
FIG. 4 shows an exploded view of outer covers and an outer housing, according to the present invention.
Figure 5:
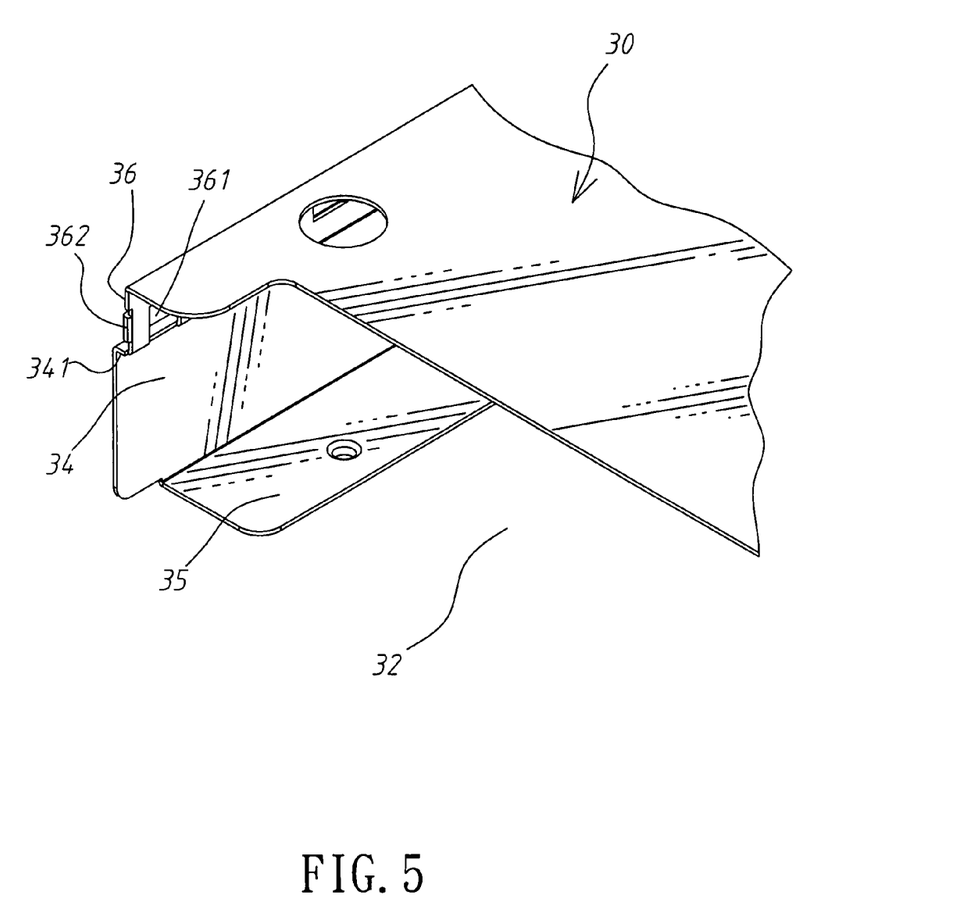
FIG. 5 shows a local exploded view of an outer cover, according to the present invention.
Figure 6:
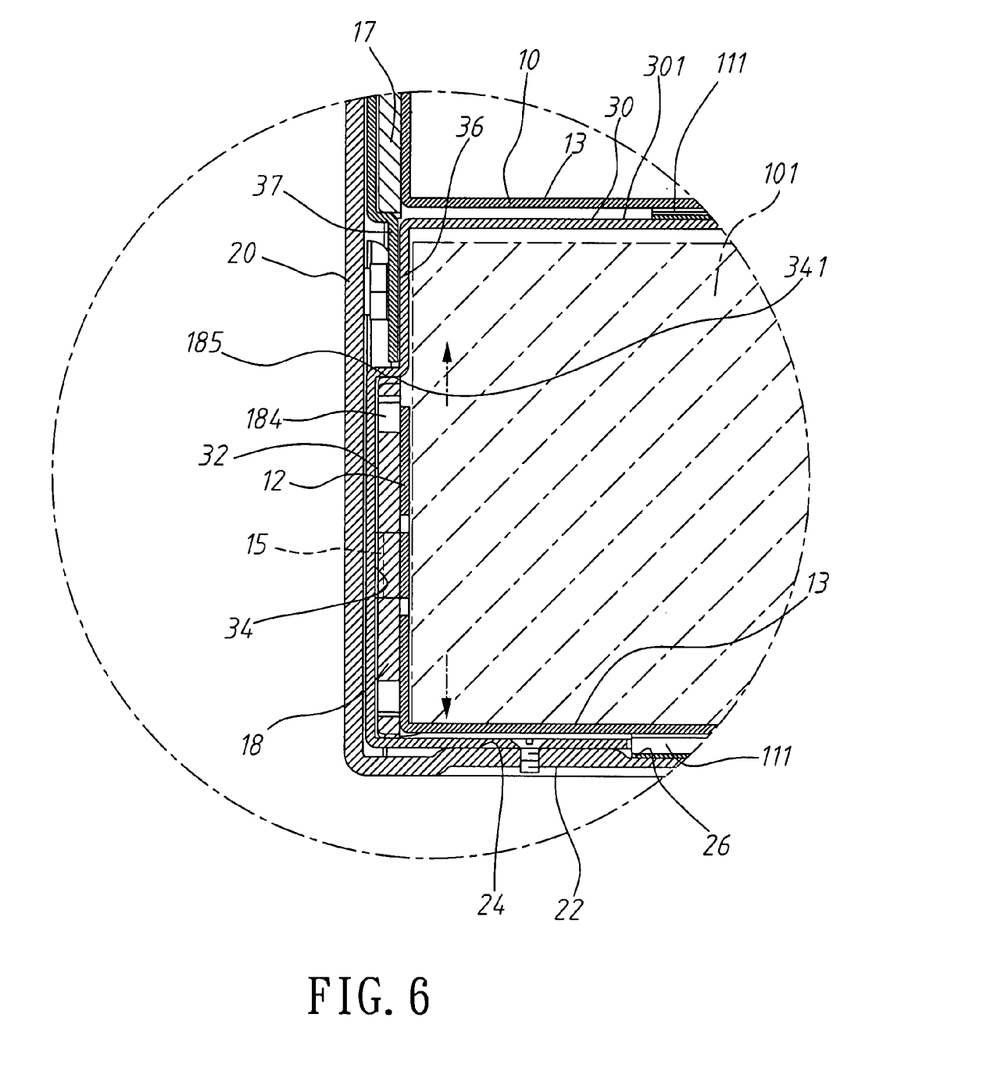
FIG. 6 shows a local cross sectional view of a data cartridge, and an outer cover that are assembled in an outer housing, according to the present invention.

Referring to FIG. 1, the present invention is to provide a data cartridge device for computer equipment, including a data cartridge 10, which is provided with a left wall 12 and a right wall 14, and an interior of which is provided with a containing space 13, with outer surfaces of the left and right walls 12, 14 being disposed respectively with arc-shape spring leaves 15 and hooks 16 that are protruded outward; a left board 17 and a right board 18, which are screwed and fixed respectively on the outer surfaces of the left and right walls 12, 14, and central positions of which are provided with at least one long through-hole 181 out of which being protruded by the arc-shape spring leaf 15, with a side of the long through-hole 181 being disposed with at least one positioning hole 182, an edge of the positioning hole 182 being disposed with a locking interface 1821 that is concaved inward, the hook 16 being transfixed out of the positioning hole 182 and being hooked at the locking interface 1821, a long narrow hole 184 being located above the long through-hole 181, and an interface above the long narrow hole 184 being formed with an arc-shape end surface 185; and an outer housing 20, which is provided with a U-shape cross section (as shown in FIG. 4), a bottom board 24 at a U-shape notch 22 of which is fixed respectively with at least one U-shape outer cover 30, with each outer cover 30 being disposed with a slot 32, left and right wall of the slot 32 being disposed respectively with an inner sliding surface 34 having a larger width (as shown in FIG. 5), a top part of the inner sliding surface 34 being formed with a top sliding surface 341, the data cartridge 10 being inserted into the slot 32 (as shown in FIG. 6), the arc-shape spring leaf 15 being abutted and sliding on the inner sliding surface 34, and the arc-shape end surface 185 being deformed, abutted and sliding on the top sliding surface 341.

When the arc-shape end surface 185 is abutted on the top sliding surface 341, the arc-shape end surface 185 is deformed and displaced toward the long narrow hole 184, to form an elastic sliding surface.

Figure 10:
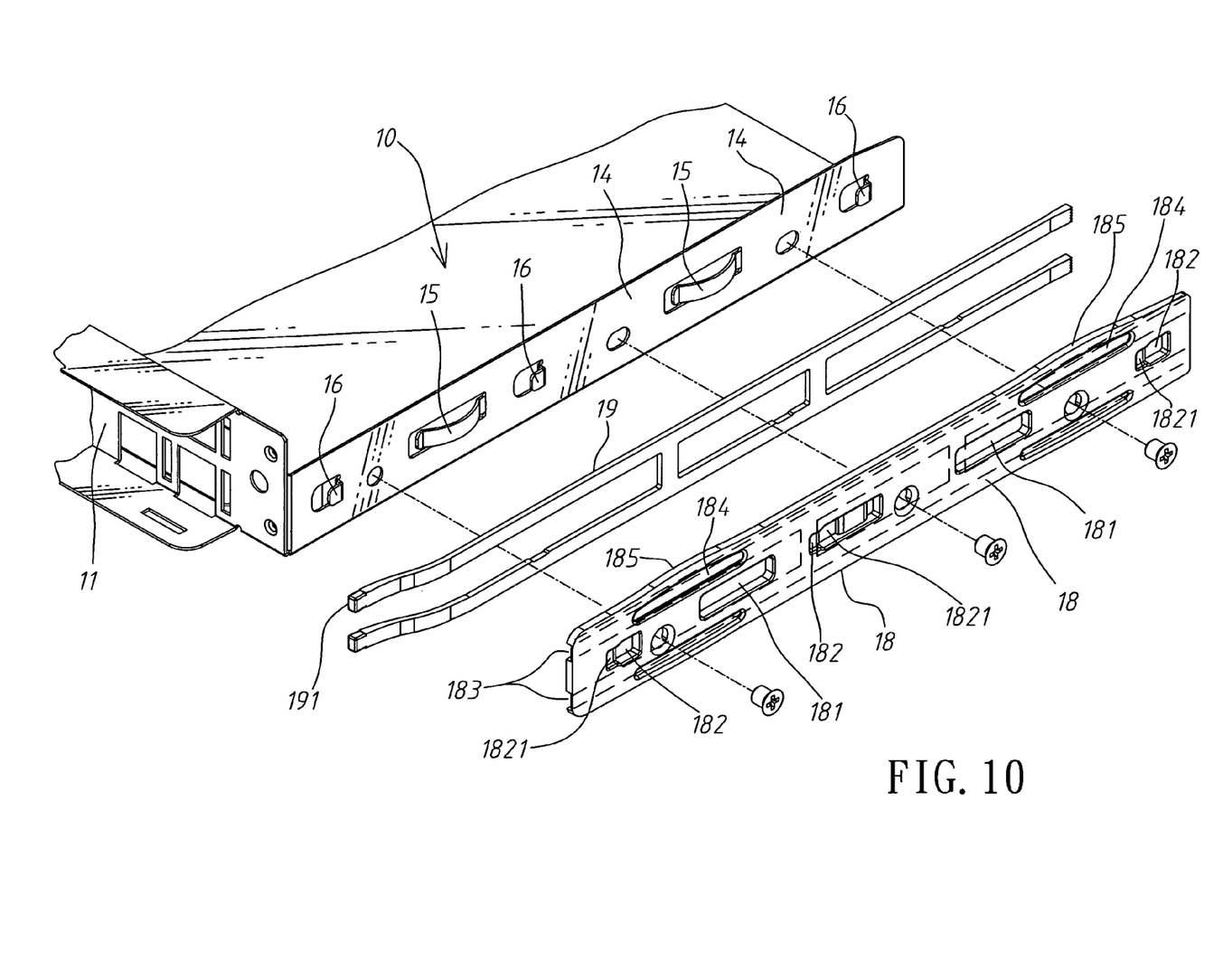
FIG. 10 shows a local exploded view of a data cartridge, according to the present invention.

Referring to FIG. 10, an inner surface of the right board 18 is formed with line-shape grooves 183, a light pipe 19 having a same shape as that of the line-shape grooves 183 is latched into the line-shape grooves 183, and is further fixed on an outer interface of the right wall 14, wherein a front end 191 of the light pipe 19 is protruded out of the line-shape grooves 183.

Referring to FIG. 4 and FIG. 5, two sides at a bottom part of the U-shape outer cover 30 in the most bottom layer are provided with horizontal connection pieces 35 for screwing and fixing into the bottom board 24. A left and a right side above the U-shape outer cover 30 are provided respectively with L-shape upper connection parts 36 which are concaved inward. Two sides below a U-shape outer cover 30' in the upper layer are provided with lower connection parts 37 which are concaved inward and extended downward in vertical direction. The lower connection parts 37 are screwed and fixed on the upper connection parts 36 of the bottom outer cover 30, to form overlapped connection for the upper and lower U-shape outer covers 30, 30'.

Referring to FIG. 1, in front of the data cartridge 10 is formed with a transversal and U-shape fixing slot 11. A seat 40 is fixed into the U-shape fixing slot 11, and a right side of the seat 40 is provided with a chamber 42, with a side wall of the chamber 42 being disposed with a through-hole 421. A right end of an outer handle 50 is provided with a connection pillar 52, a left side of a middle element 60 is provided with a U-shape slot 62 which is protruded outward, an end at a side of the U-shape slot 62 is formed with a first projected body 621, and an end at the other side is formed with a second projected body 622. A side surface of the middle element 60 is provided with a shaft hole 63, and a surface of the middle element 60 is disposed with a left insertion hole 65 and a right insertion hole 64. An elastic element 67 is provided with a left insertion hole 671 on its left board, and its right side is formed with a twitching member 672 in a vertical sheet shape, with a rear wall of the twitching member 672 being provided with a projected body 68 in a slope shape. The connection pillar 52 of the outer handle 50 is inserted into the left insertion hole 671, and the right insertion hole 64 of the middle element 60, enabling the elastic element 67 to be positioned at a right side of the middle element 60, the projected body 68 to be locked into the through-hole 421 of the seat 40, and the twitching member 672 to be located at a side in the chamber 42. An inner wall of the outer handle 50 is protruded with a projected body 51 which is transfixed into the left insertion hole 65 of the middle element 60, enabling the outer handle 50 to be assembled with the middle element 60 into one body. A shaft 43 is transfixed into a left shaft hole 45 of the seat 40, and the shaft hole 63 of the middle element 60, and the shaft 43 is sheathed with a spring 44, enabling the outer handle 50 and the middle element 60 to rotate elastically, with the shaft 43 as a center of axis.

Figure 8:
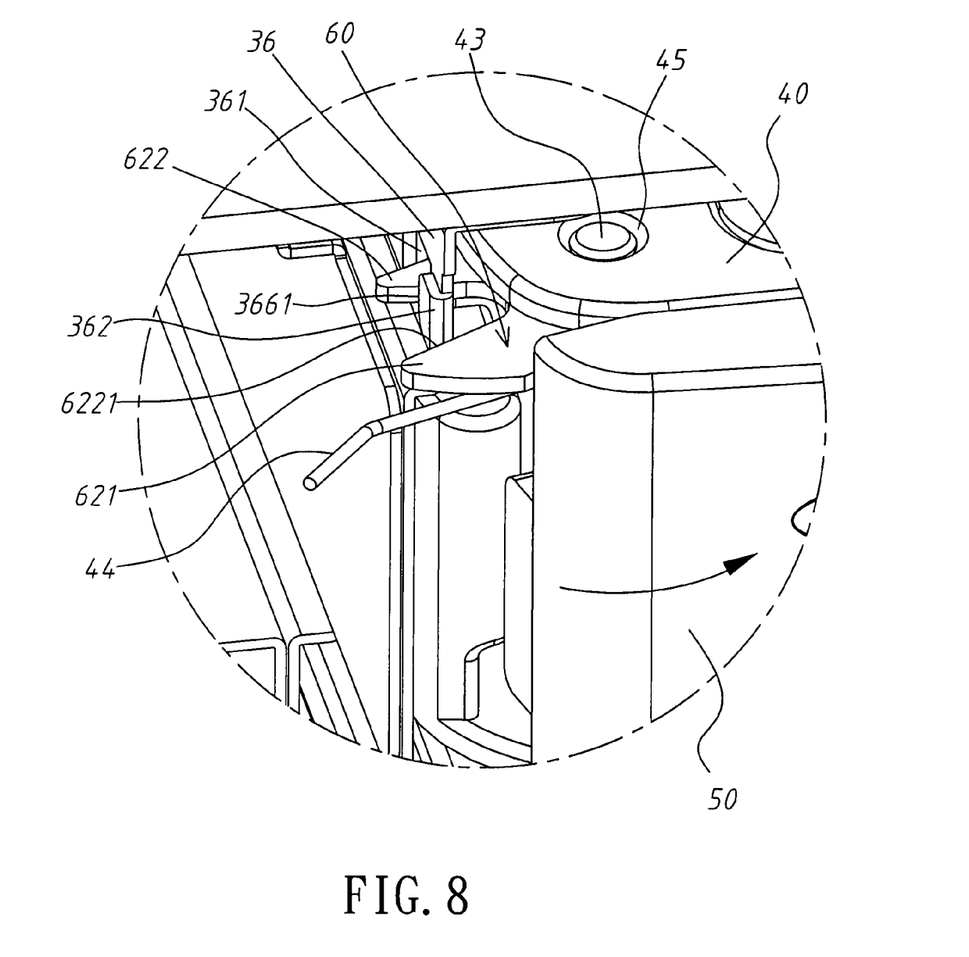
FIG. 8 shows a local exploded view of a data cartridge that is assembled in an outer cover, according to the present invention.
Figure 9:
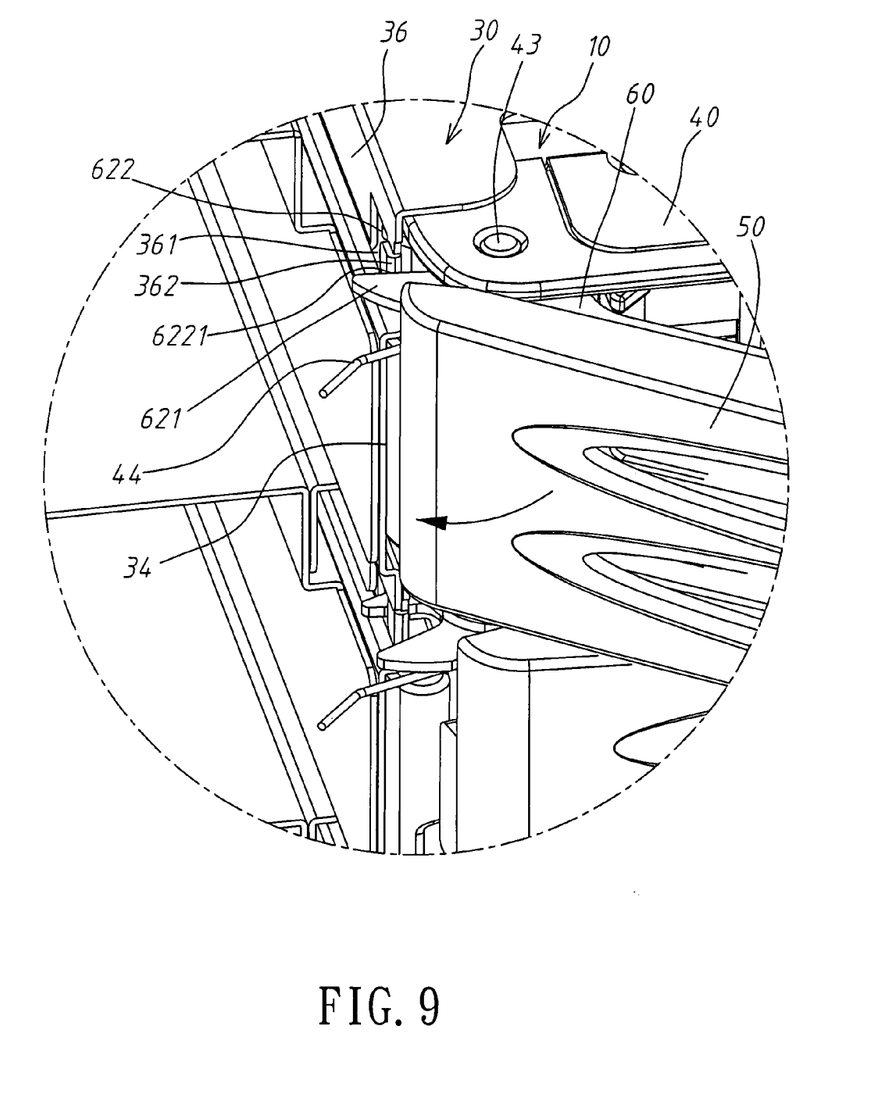
FIG. 9 shows a local schematic view of a data cartridge that is opened from an outer cover, according to the present invention.

Referring to FIG. 5, a wall of the upper connection part 36 at the left side of the U-shape outer cover 30 is excavated with a through-hole 361. Referring to FIG. 8 and FIG. 9, the second projected body 622 of the middle element 60 is locked into the through-hole 361, and the first projected body 621 corresponds to an outer edge end 362 of the upper connection part 36.

Referring to FIG. 1, a bottom part of the U-shape fixing slot 11 is fixed with a V-shape spring leaf 111.

Figure 2:
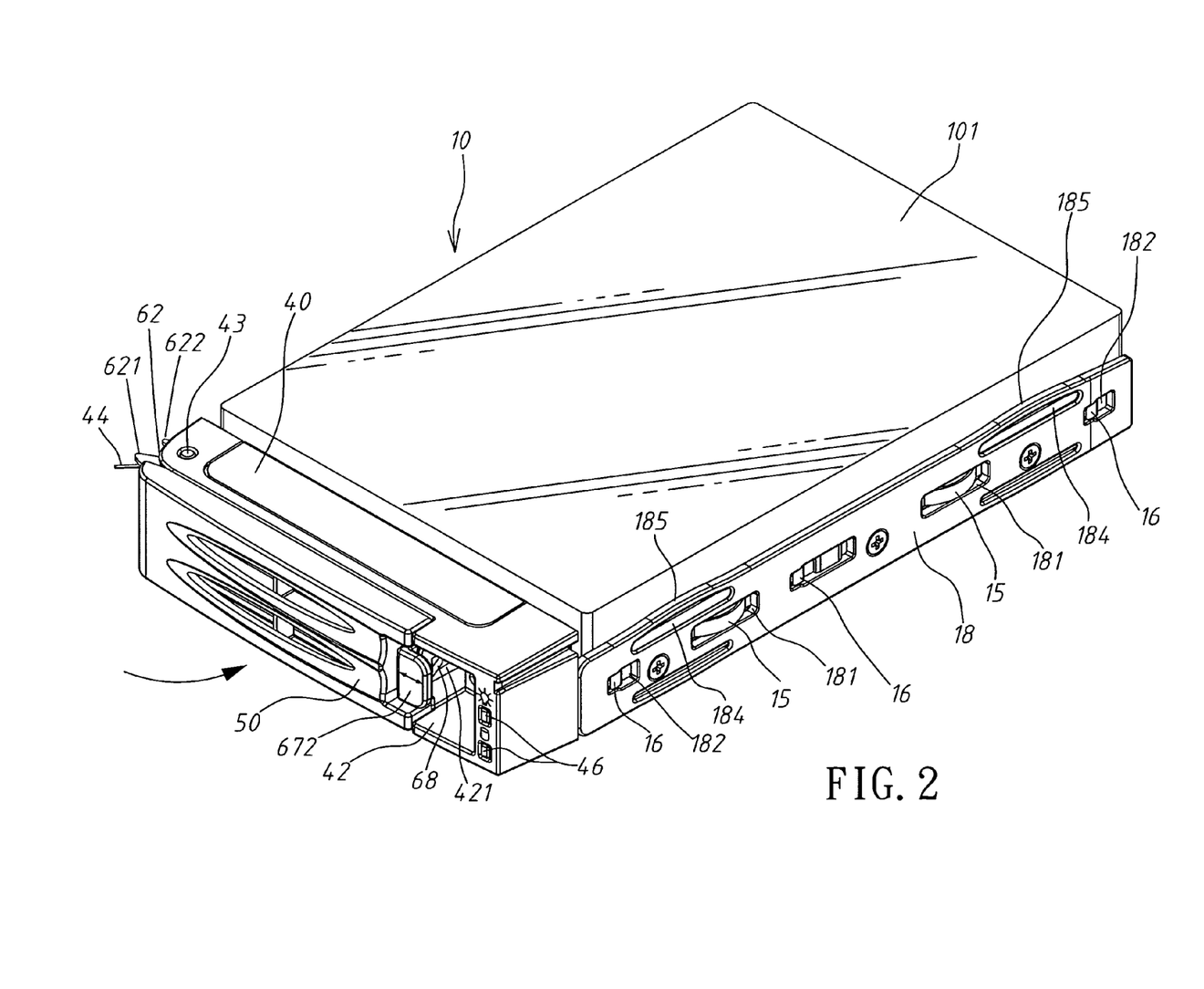
FIG. 2 shows a schematic view of a data cartridge which is assembled, according to the present invention.

Referring to FIG. 2 and FIG. 10, a right surface of the chamber 42 is provided with at least one lens cover 46, and the front end 191 of the light pipe 19 corresponds to the lens cover 46, wherein an end of the arc-shape spring leaf 15 is suspended in air, and the other connection end is formed integrally with the left and right walls 12, 14.

Referring to FIG. 1, the containing space 13 of the data cartridge 10 can be fixed with a hard disk drive 101 or other data processor, and the spring 44 is a kind of L-shape spring, with its two top abutting ends being abutted respectively on an inner wall of the seat 40, and an outer wall of the middle element 60, enabling the middle element 60 and the outer handle 50 to form an elastic assembly.

Referring to FIG. 6, when the data cartridge 10 is inserted into the slot 32, the arc-shape spring leaf 15 is abutted on and sliding in deformation on the inner sliding surface 34. As an end of the arc-shape spring leaf 15 is suspended in air, it can be easily deformed, enabling the left and right boards 17, 18 to slide smoothly. When the arc-shape end surface 185 is abutted on the top sliding surface 341, the arc-shape end surface 185 will be elastically deformed downward, due to the design of the long narrow hole 184. In addition, as a diameter of the long narrow hole 184 is decreased, the arc-shape end surface 185 will be sliding smoothly on the top sliding surface 341. When the data cartridge 10 is inserted into the slot 32 until being positioned, as an interior of the outer housing 20 is installed with vibration elements, such as cooling fans (not shown in the drawing), the data cartridge 10 can be under a vibration condition. However, during vibration, as the arc-shape end surface 185 forms an elastic interface, the data cartridge 10 is provided with a shock-proof effect. In a same time, the arc-shape spring leaf 15 is also provided with a damping effect, which further minimizes the vibration of the still data cartridge 10, thereby preventing objects that are fixed in the data cartridge 10 from being damaged by long term vibration force.

Referring to FIG. 2, the outer handle 50 and the middle element 60 are assembled into one body, and an end of the elastic element 67 is also fixed in an intermediate connection interface (as shown in FIG. 1) between the outer handle 50 and the middle element 60. When the data cartridge 10 is inserted into the slot 32 until being positioned, an operator will hold the outer handle 50 and the middle element 60 to rotate clockwise inward, with the shaft 43 as a center of axis. Referring to FIG. 8, at this time, the second projected body 622 is locked into the through-hole 361, and slides frictionally with an inner wall 3661 of the through-hole 361 as a point of application, enabling the second projected body 622 to be completely transfixed into the through-hole 361, and forcing the data cartridge 10 to further slide forward to move into the slot 32. Referring to FIG. 1, the projected body 68 of the elastic element 67 can slide along an inner wall 425 of the chamber 42. At this time, the elastic element 67 is in an elastic compression state. When the projected body 68 corresponds, to the through-hole 421, the elastic element 67 will be in an elongation state, enabling the outer handle 50 and the middle element 60 to be positioned at the seat 40, and the spring 44 to be restored (as shown in FIG. 2 and FIG. 8), upon that the projected body 68 is extended into the through-hole 421.

Figure 3:
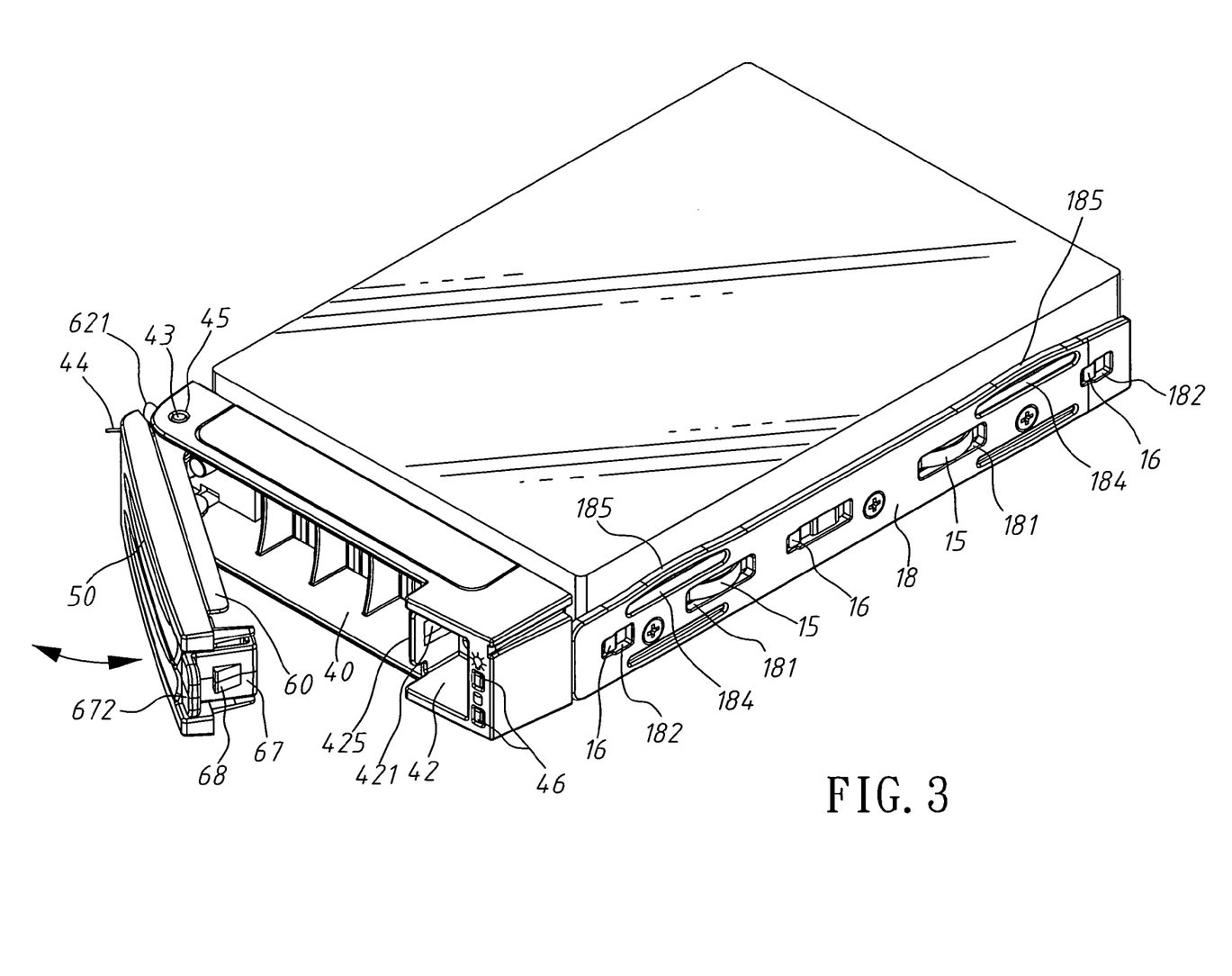
FIG. 3 shows a schematic view of a data cartridge with an outer handle in an opened state, according to the present invention.

Referring to FIG. 3 and FIG. 9, which are schematic views that the data cartridge 10 is extracted out of the slot 32 by human fingers (not shown in the drawings), the fingers are extended into the chamber 42 and exert transversal pressure to the twitching member 672 in FIG. 2, along horizontal direction, enabling the elastic element 67 to be in a compression state. In a mean time, the projected body 68 is moved out of the through-hole 421 simultaneously. Then, the fingers rotate the outer handle 50 and the middle element 60 clockwise, with the shaft 43 as a center of axis, and the spring 44 will be in an elastic compression state. In addition, an inner edge 6221 of the first projected body 621 will carry out friction, abutting, and sliding actions on the outer edge end 362 (as shown in FIG. 9), such that upon the outer handle 50 being opened by force exerted by the fingers, the entire data cartridge 10 will be sliding out of the slot 32 by a certain distance, and the second projected body 622 will be released from the through-hole 361. Therefore, at this time, a palm of a user can hold the seat 40 to extract the entire data cartridge 10 out of the slot 32. As shown in FIG. 6 and FIG. 9, due to the design of the arc-shape end surface 185 and the arc-shape spring leaf 15, the left and right boards 17, 18 can slide smoothly, and the data cartridge 10 can be extracted out of the slot 32 easily.

Figure 7:
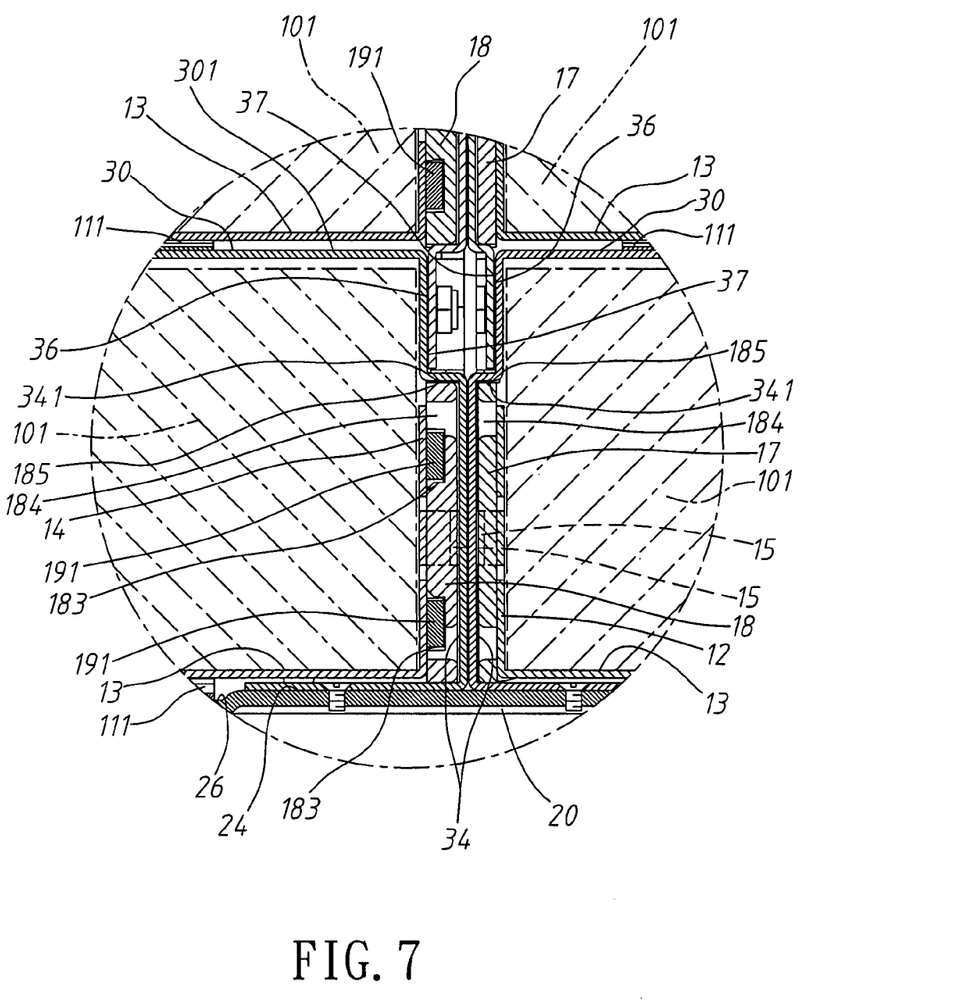
FIG. 7 shows another local cross sectional view of a data cartridge, and an outer cover that are assembled in an outer housing, according to the present invention.

Referring to FIG. 6 and FIG. 7, when the V-shape elastic element 111 is sliding on a bottom surface 26 of the outer housing 20, or on a top surface 301 of the outer cover 30 as shown in FIG. 4, the elastic element 111 will be deformed elastically. The object is to increase stability for a lower end of the data cartridge 10 upon sliding. In a same time, when the data cartridge 10 is still, it is also provided with a shock-absorption effect. Furthermore, the V-shape elastic element 111 is made by a copper material, and hence is provided with a grounding effect to prevent from EMI (Electromagnetic Interference).

Referring to FIG. 6 and FIG. 7, when the upper and lower outer covers 30, 30' are stacked for connection (such as upon being implemented to an outer housing 20 with a height larger than 2 U), the top surfaces 301 of the outer covers 30, 30' can be used as sliding interfaces for lower surfaces of the data cartridges 10, and also form positioning interfaces for the data cartridges 10. Therefore, an interior of the U-shape outer housing 20 does not need to be further installed with transversal support beams, so as to reduce manufacturing cost and to effectively utilize an internal space of the U-shape outer housing 20. Accordingly, by the modularized design of the data cartridges 10 and the outer covers 30, 30', the present invention can be flexibly applied to all kinds of the outer housings 20 with various heights. For example, the present invention can be implemented to a computer housing with a height larger than 1 U, 2 U, or 3 U (such as the outer housing 20 of the present invention), can be implemented to the outer housing 20 with a height of 1 U for connection to one layer of the outer covers 30, can be implemented to the outer housing 20 with a height of 2 U for connection to two layers of the outer covers 30, 30', or can be implemented to the outer housing 20 with a height of 3 U for connection to three layers of the outer covers 30, 30'.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A data cartridge device for computer equipment comprising:
a data cartridge, which is provided with a left wall and a right wall, and an interior of which is provided with a containing space, with outer surfaces of the left and right walls being disposed respectively with arc-shape spring leaves and hooks that are protruded outward; a left board and a right board, which are screwed and fixed respectively on the outer surfaces of the left and right walls, and central positions of which are provided with at least one long through-hole out of which being protruded by the arc-shape spring leaf, with a side of the long through-hole being disposed with at least one positioning hole, an edge of the positioning hole being disposed with a locking interface that is concaved inward, the hook being transfixed out of the positioning hole to be hooked at the locking interface, a long narrow hole being located above the long through-hole, and an interface above the long narrow hole being formed with an arc-shape end surface; and an outer housing, which is provided with a U-shape cross section, a bottom board at a U-shape notch of which is fixed respectively with at least one U-shape outer cover, with each outer cover being disposed with a slot, left and right wall of the slot being disposed respectively with an inner sliding surface having a larger width, a top part of the inner sliding surface being formed with a top sliding surface, the data cartridge being inserted into the slot, the arc-shape spring leaf being abutted and sliding on the inner sliding surface, and the arc-shape end surface being deformed, abutted and sliding on the top sliding surface.

2. The data cartridge device for computer equipment, according to claim 1, wherein upon that the arc-shape end surface is abutted on the top sliding surface, the arc-shape end surface is deformed and displaced toward the long narrow hole, to form an elastic sliding surface.

3. The data cartridge device for computer equipment, according to claim 1, wherein the inner surface of the right board is formed with line-shape grooves, a line-shape light pipe which has a same shape as that of the line-shape grooves is latched into the line-shape grooves, and is further fixed on an outer interface of the right wall, with a front end of the light pipe being protruded out of the line-shape grooves.

4. The data cartridge device for computer equipment, according to claim 1, wherein two sides at a bottom part of the U-shape outer cover in the most bottom layer are provided with horizontal connection pieces for screwing and fixing into the bottom board, with a left and a right side above the U-shape outer cover being provided respectively with L-shape upper connection parts which are concaved inward; two sides below a U-shape outer cover in the upper layer being provided with lower connection parts which are concaved inward and extended downward in vertical direction, with the lower connection parts being screwed and fixed on the upper connection parts of the bottom outer cover, thereby forming overlapped connection for the upper and lower U-shape outer covers.

5. The data cartridge device for computer equipment, according to claim 1, wherein in front of the data cartridge is formed with a transversal U-shape fixing slot, with a seat being fixed into the U-shape fixing slot, a right side of the seat being provided with a chamber, and a side wall of the chamber being provided with a through-hole; an outer handle, a right end of which is provided with a connection pillar; a middle element, a left side of which is provided with a U-shape slot that is protruded outward, with an end at a side of the U-shape slot being formed with a first projected body, an end at the other side being formed with a second projected body, a side surface of the middle element being provided with a shaft hole, and a surface of the middle element being provided with a left insertion hole and a right insertion hole; an elastic element, a left board of which is provided with a left insertion hole, a right side of which is formed with a twitching member in a vertical sheet shape, with a rear wall of the twitching member being provided with a projected body in a slope shape, the connection pillar of the outer handle being inserted into the left insertion hole, and the right insertion hole of the middle element, enabling the elastic element to be positioned at the right side of the middle element, the projected body to be locked into the through-hole of the seat, the twitching member to be located at a side in the chamber; and an inner wall of the outer handle being protruded with a projected body which is transfixed into the left insertion hole of the middle element, enabling the outer handle to be assembled with the middle element into one body.

6. The data cartridge device for computer equipment, according to claim 1, wherein a shaft is transfixed into a left shaft hole of the seat, and a shaft hole of the middle element, with the shaft being sheathed with a spring, enabling the outer handle and the middle element to rotate elastically, with the shaft as a center of axis.

7. The data cartridge device for computer equipment, according to claim 1, wherein a wall of an upper connection part at a left side of the U-shape outer cover is excavated with a through-hole; the second projected body of the middle element being locked into the through-hole, and the first projected body corresponding to an outer edge end of the upper connection part.

8. The data cartridge device for computer equipment, according to claim 1, wherein a bottom part of the U-shape fixing slot is fixed with a V-shape spring leaf.

9. The data cartridge device for computer equipment, according to claim 1, wherein a right surface of the chamber is provided with at least one lens cover, with a front end of the light pipe corresponding to the lens cover.

10. The data cartridge device for computer equipment, according to claim 1, wherein an end of the arc-shape spring leaf is suspended in air, with the other connection end being formed integrally with the left and right walls.

* * * * *